March 15, 1932.  E. J. FARKAS  1,850,004
VEHICLE SPRING SUSPENSION
Filed Aug. 5, 1930
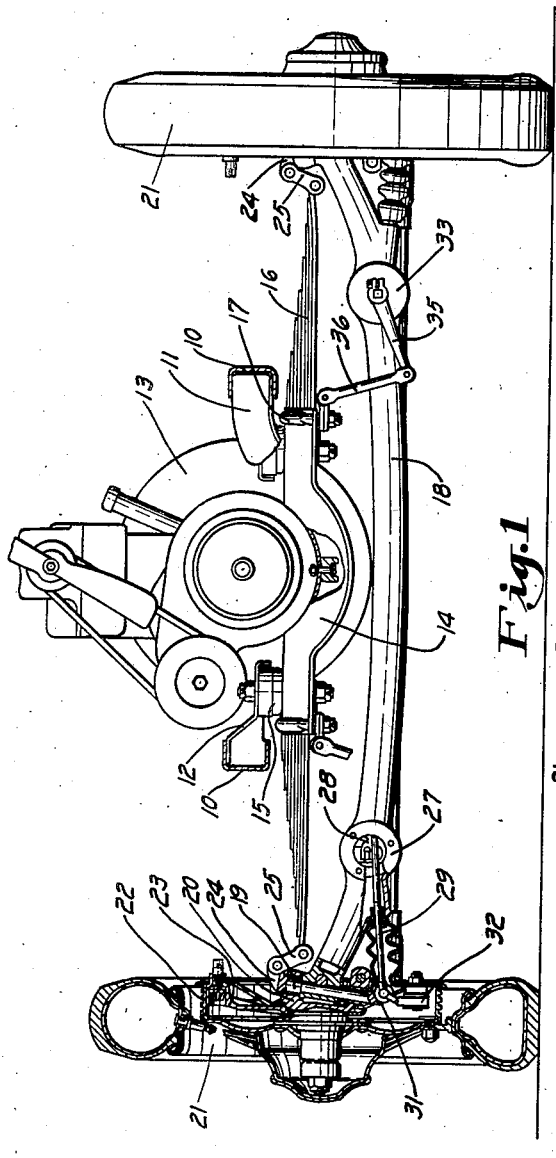
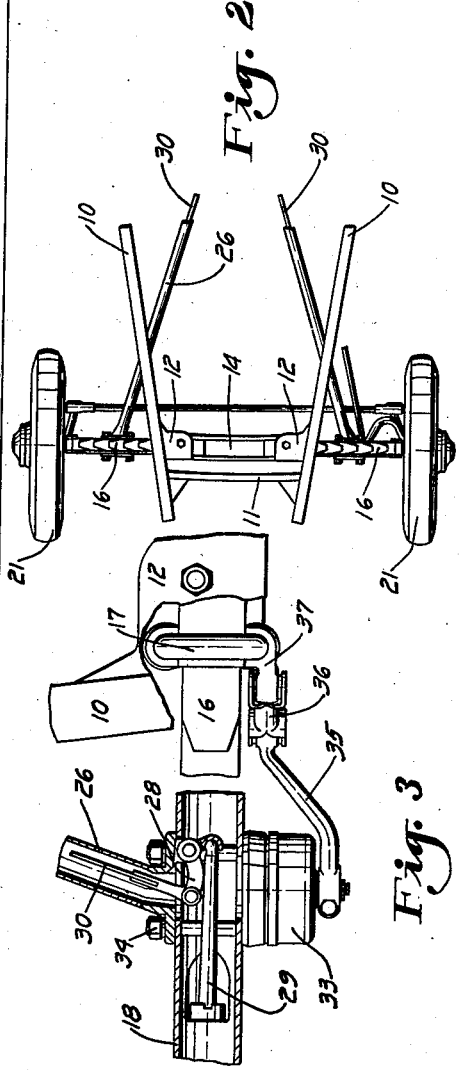
Witness.
E. C. McRae.
INVENTOR.
E. J. Farkas.
BY
ATTORNEY.

Patented Mar. 15, 1932

1,850,004

UNITED STATES PATENT OFFICE

EUGENE J. FARKAS, OF DETROIT, MICHIGAN, ASSIGNOR TO FORD MOTOR COMPANY, OF DEARBORN, MICHIGAN, A CORPORATION OF DELAWARE

VEHICLE SPRING SUSPENSION

Application filed August 5, 1930. Serial No. 473,166.

The object of my invention is to provide an automobile spring suspension of simple, durable, and inexpensive construction.

A further object of my invention is to provide a spring suspension which is particularly adapted for use in supporting the front end of an automobile which spring suspension will give either greater flexibility under vertical impact loads or will increase the lateral stability of the car. In other words, when a sufficient number of spring leaves are provided to give a predetermined resiliency or absorption of impact loads greater lateral stability will result than would be obtained with the equivalent resiliency incorporated in the conventional type of springs.

My improved spring suspension is of the transverse type and is particularly adapted for use in connection with a tubular axle. No bosses, spring perches or the like are required to be formed on the axle for connecting the spring thereto so that a tubular axle may be conveniently used. I accomplish this desirable feature by forging the upper end of each king pin to form spring perches to which the outer ends of the springs are fastened. The static and impact loads on the car are transmitted from the wheels directly through the king pins to the car springs thereby relieving the front axle of these loads. For the reason that only the torsional braking loads of the wheels must be absorbed through the front axle, it may be made considerably lighter and still maintain the same factor of safety to thereby lessen the unsprung weight of the car.

Still a further object of my invention is to provide a novel hydraulic shock absorber mounting wherein the ball joint connections ordinarily provided between the shock absorber arms and the vehicle frame are eliminated and simple clevis connections substituted therefor. These clevis connections are not only much cheaper to manufacture but also provide a connection superior to the ball type connection.

With these and other objects in view my invention consists in the arrangement, construction and combination of the various parts of my improved device, as described in the specification, claimed in my claims, and illustrated in the accompanying drawings, in which:

Figure 1 shows a front elevation of an automobile chassis having my improved spring suspension installed thereon.

Figure 2 shows a plan view of the front portion of the chassis shown in Figure 1, and Figure 3 shows a view of my improved shock absorber mounting, part of the front axle being broken away to better illustrate the construction.

Referring to the accompanying drawings, I have used the reference numeral 10 to indicate the side members of an automobile frame having a front cross member 11 disposed therebetween and reinforced by a pair of gusset plates 12. The rear end of a motor 13 is mounted in the forward portion of the chassis between the side member 10, while the forward end of this motor is secured to the center portion of a channel member 14 which extends transversely beneath the cross member 11. A pair of rubber cushions 15 are interposed between the gusset plates 12 and the ends of this channel member so that the forward end of the motor is insulated from the frame. A pair of quarter elliptic springs 16 are secured in the outer ends of the channel 14 by U bolts 17 and extend outwardly to form a type of transverse spring. It will be noted that the road shock must be transmitted through both the springs 16 and cushions 15 to affect the frame of this car.

I have provided a tubular front axle 18 having a pair of substantially vertical king pins 19 disposed in each end thereof upon which knuckle joints 20 are swivelly mounted. A pair of front wheels 21 are rotatably mounted on the knuckle joints 20 in the conventional manner, each of these wheels being provided with a brake drum 22. A brake anchor plate 23 is fixedly secured to each knuckle joint 20 and upon these plates internal expanding brake shoes are mounted to operably engage the brake drums 22.

The upper end of each king pin 19 is provided with an eye 24 to which a spring shackle 25 is pivotally secured. The lower end of each spring shackle 25 is pivotally secured to the outer end of the respective spring 16 so that the impact loads of the vehicle are transmitted from the wheels to the car without being transferred through the axle 18. No bending strains are thereby induced in the axle from impact loads. A pair of tubular radius rods 26 are fastened to the axle 18 at points spaced from the ends thereof and extend rearwardly where they are pivotally secured to the under side of the engine unit. The front axle is thereby supported against longitudinal movement in the conventional manner by these radius rods.

It will be noted that each spring 16 extends from one of the frame side members outwardly to practically the end of the axle. For this reason greater lateral stability is obtained with this structure than is possible to obtain with the ordinary transverse spring or with longitudinal springs.

A novel feature in connection with my improved device arises because the mechanism for operating the front wheel brakes is housed entirely within the axle 18 and radius rods 26 so that no exposed rods or the like need be used. To accommodate this mechanism the axle 18 is provided with a pair of enlarged portions 27 adjacent to the radius rod connections. The detailed description of the mechanism for operating my brakes will not be given here as it is believed sufficient to state that an operating rod 30 extends through each of the radius rods 26 into the enlarged portion 27 of the axle 18 where each rod is secured to a bell crank lever 28 within these portions. Push rods 29 extend out through the lower portion of the axle from the free arms of the bell crank levers 28 so that drawing the rods 30 will pivot the bell crank levers 28 thereby pushing the rods 29 outwardly. The lower end of each king pin 19 is provided with an outwardly and downwardly inclined track 31 against which the outer end of one push rod 29 operates to thereby force these ends of the push rods downwardly when their inner ends are forced outwardly. A brake operating wedge 32 is actuated by the outer end of each push rod 29 so that when the device is operated the wedge 32 is pushed downwardly to thereby apply the brakes.

It will be seen from Figure 3 that the radius rods 26 form the enclosures for the rear face of the enlarged portions 27. I have provided novel shock absorber mountings which enclose the front faces of these enlarged portions to complete the enclosures for the bell cranks 28. Rotary type hydraulic shock absorbers 33 are each provided with a pair of studs 34 which extend rearwardly therefrom through the enlarged portions 27 of the axle and through the forward ends of the radius rods. The shock absorbers, axle and radius rods are thereby secured together by these studs 34 so that an enclosure is formed which houses the brake operating mechanism.

A pair of arms 35 for operating the shock absorbers extend inwardly substantially parallel to the axle 18 and links 36 are pivotally connected to their free ends and extend upwardly where they are pivotally secured to clamping plates 37, the plates being held in place by the U bolts 17. Only simple clevis connections are required between the ends of the links 36 and the arms 35 and plates 37 for the reason that these arms oscillate in the same plane in which the springs 16 flex. The elimination of the conventional ball joints for connecting up the shock absorbers materially lessens the cost of this structure and further, forms a superior connection between the chassis frame and the shock absorber.

Among the many advantages arising from the use of my improved device, it may be well to mention that I have provided a novel spring suspension which increases the lateral stability of the car and still maintains the desired flexibility for absorbing vertical impact loads. Further, the vertical loads on the springs are transmitted from the wheels directly to the springs without being transmitted through the front axle thereby eliminating the major load on this axle. A much lighter axle construction can thereby be provided to lessen the unsprung weight of the car.

Still further, my novel shock absorber mounting provides an enclosure for the brake operating mechanism thereby eliminating the otherwise necessary parts required to form this enclosure. These shock absorbers being mounted so that their operating arms swing in a plane parallel to the plane in which the adjacent springs flex makes it unnecessary to provide ball joints for connecting these operating arms with the chassis frame. The cost of the shock absorber mounting is thereby materially reduced and a superior connection provided.

Some changes may be made in the arrangement, construction, and combination of the various parts of my improved device without departing from the spirit of my invention, and it is my intention to cover by my claims, such changes as may reasonably be included within the scope thereof.

I claim as my invention:

1. In a vehicle spring suspension, a chassis frame, a spring retaining member disposed beneath the front end of said frame, resilient cushions disposed between said retaining member and said frame, a front axle, substantially vertical king pins secured in the ends of said axle, and quarter elliptic springs extending between the ends of said retaining member and king pins to support the chassis frame.

2. In a vehicle spring suspension, a chassis frame, a transverse spring retaining member disposed beneath the front end of said frame, resilient cushions disposed between the ends of said retaining member and said frame, an engine having its rear portion mounted on said frame and its forward portion fixedly secured to said retaining member, a front axle, substantially vertical king pins secured in the ends of said axle, and quarter elliptic springs extending between the outer ends of said retaining member and said king pins to support the chassis frame.

EUGENE J. FARKAS.